US009828112B2

United States Patent
Girod et al.

(10) Patent No.: US 9,828,112 B2
(45) Date of Patent: Nov. 28, 2017

(54) METHOD AND SYSTEM FOR TRIGGERING AN EMERGENCY MEASURE

(71) Applicant: Airbus Operations GmbH, Hamburg (DE)

(72) Inventors: Maurice Girod, Hamburg (DE); Matthew Greaves, Olney (GB); Uwe Bartels, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 155 days.

(21) Appl. No.: 14/840,142

(22) Filed: Aug. 31, 2015

(65) Prior Publication Data

US 2016/0075444 A1   Mar. 17, 2016

(30) Foreign Application Priority Data

Sep. 15, 2014   (EP) .................................... 14184845

(51) Int. Cl.
*B64D 45/00* (2006.01)
*G08G 5/00* (2006.01)

(52) U.S. Cl.
CPC ........... *B64D 45/00* (2013.01); *G08G 5/0056* (2013.01); *B64D 2045/0065* (2013.01)

(58) Field of Classification Search
CPC ............ B64D 45/00; B64D 2045/0065; G08G 5/0056
See application file for complete search history.

(56) References Cited

U.S. PATENT DOCUMENTS

| 6,278,913 | B1* | 8/2001 | Jiang | G07C 5/0858 244/158.1 |
| 8,706,357 | B1* | 4/2014 | van den Heuvel | B64D 45/00 701/14 |
| 2003/0128122 | A1* | 7/2003 | Reynolds | B64D 45/0015 340/573.1 |
| 2005/0065667 | A1* | 3/2005 | Weineck | B64D 45/0015 701/3 |
| 2012/0138741 | A1* | 6/2012 | Fabre | G01S 5/0231 244/1 R |
| 2013/0073120 | A1 | 3/2013 | Bailey et al. | |

(Continued)

OTHER PUBLICATIONS

European Search Report for Application No. 14184845 dated Dec. 9, 2014.

(Continued)

*Primary Examiner* — Dale Moyer
(74) *Attorney, Agent, or Firm* — Jenkins, Wilson, Taylor & Hunt P.A.

(57) ABSTRACT

A method for triggering a plurality of emergency measures associated with an aircraft emergency is disclosed. The method includes determining a risk level for an aircraft emergency by evaluating a plurality of flight parameters and/or aircraft parameters using a predefined logic. For each emergency measure of the plurality of emergency measures a threshold is defined and each emergency measure of the plurality of emergency measures is only triggered if the determined risk level exceeds the threshold defined for the emergency measure. Further, a system for use onboard an aircraft for triggering a plurality of emergency measures associated with an aircraft emergency and an aircraft comprising such a system are disclosed.

16 Claims, 1 Drawing Sheet

(56) References Cited

U.S. PATENT DOCUMENTS

2014/0180502 A1  6/2014  Dorneich et al.
2016/0075446 A1  3/2016  Girod et al.

OTHER PUBLICATIONS

Non-Final Office Action for U.S. Appl. No. 14/846,170 dated Oct. 26, 2016.
Digitisation of technical documents/reports of Tech Coord Division [Tender documents: T25551138], MENA Report, Mar. 18, 2011 (Mar. 18, 2011), XP055179114, London. Retrieved from the Internet [Mar. 25, 2015]: URL:httb://search.proquest.com/docview/1647659190.
European Search Report for Application No. 14184846 dated Mar. 27, 2015.
Final Office Action for U.S. Appl. No. 14/846,170 dated Feb. 27, 2017.
Advisory Action for U.S. Appl. No. 14/846,170 dated May 24, 2017
Interview Summary for U.S. Appl. No. 14/846,170 dated Jun. 1, 2017.
Notice of Allowance and AFCP Decision for U.S. Appl. No. 14/846,170 dated Jun. 8, 2017.

* cited by examiner

METHOD AND SYSTEM FOR TRIGGERING AN EMERGENCY MEASURE

CROSS-REFERENCE TO RELATED APPLICATION

This application claims priority to European Patent Application No. 14184845.7 filed Sep. 15, 2014, the entire disclosure of which is incorporated by reference herein.

TECHNICAL FIELD

The present disclosure relates to a method for triggering a plurality of emergency measures associated with an aircraft emergency, wherein the method comprises determining a risk level for an aircraft emergency by evaluating a plurality of flight parameters and/or aircraft parameters using a predefined logic. The disclosure herein further relates to a system for use onboard an aircraft for triggering a plurality of emergency measures associated with an aircraft emergency and an aircraft comprising such a system.

BACKGROUND

If aircraft are in emergency situations, several emergency measures are provided e.g. Emergency Locator Transmitters notifying rescue personal of a location of the aircraft or flight recorders that record flight and aircraft parameters to determine a cause of the emergency situation later on. Some of these emergency measures such as the flight recorder operate continuously whereas others such as the Emergency Locator Transmitters need to be activated. Emergency Locator Transmitters are nowadays equipped with acceleration sensors that activate the Emergency Locator Transmitter if high negative accelerations are sensed. The acceleration sensors essentially activate the emergency measure in the same moment an actual crash or impact occurs as the negative acceleration is a result of the impact. However, there have been occurrences of malfunctioning acceleration sensor based Emergency Locator Transmitters.

It appears that the transmitters were destroyed by the impact before the sensors detected that the aircraft experienced an impact or before the transmitters were able to establish a communications link and send an emergency signal. Hence, there is a need for a sufficiently early triggering, i.e. pre-crash or pre-impact, of emergency measures such as Emergency Locator Transmitters.

Such pre-crash or pre-impact triggering is, for example, also required for initiating the transmission of flight recordings from the aircraft to a ground control in case of an emergency. These transmitted flight recordings facilitate a rapid accident investigation without having to search for the flight recorders and avoid high costs during regular flight caused by continuous transmissions of flight recordings.

A different problem arises with another emergency measure in form of Deployable Flight Recorders. Deployable Flight Recorders are equipped with sensors that trigger an ejection or deployment of the Deployable Flight Recorder. Here, the problem is not a late deployment of the Deployable Flight Recorders but rather unintended deployments due to malfunction of the sensors. An unintentionally ejected flight recorder might cause damage to the aircraft and, in particular, cause damage to wherever it drops onto the ground. Thus, there also is a need to prevent an unintended triggering of emergency measures such as Deployable Flight Recorders.

SUMMARY

In more general terms it is apparent from the description above that there is a need for an effective and robust, automated method and system for the detection of aircraft emergencies. To this end the Bureau d'Enquêtes et d'Analyses pour la sécurité de l'aviation civil (BEA) has established a "Triggered Transmission of Flight Data Working Group" which has published a report in 2011 describing the results of the working group. The working group focused on the general idea of evaluating flight parameters and other aircraft parameters to determine if an aircraft is in a normal flight situation or in an emergency situation.

In the report two methods are described for evaluating a plurality of flight and aircraft parameters. The methods employ either a Boolean or a fuzzy logic to determine if the aircraft is in a normal flight situation or an emergency situation. The evaluated parameters include general parameters defining flight maneuvers of the aircraft such as a roll angle, a roll rate, a pitch angle, a pitch rate, a calibrated airspeed (CAS), an indicated airspeed (IAS), an acceleration of the aircraft along the yaw axis or the roll axis and a radio altitude (i.e. an altitude above ground). Furthermore, other aircraft parameters indicating a state of the aircraft such as a stall warning, an overspeed warning, an excessive roll or rudder command, a terrain awareness and warning system (TAWS) warning, a traffic alert and collision avoidance system (TCAS) warning and a cabin altitude warning have also been evaluated. Sets of boolean and fuzzy logic rules were defined. These rules return an aircraft emergency or no aircraft emergency result. Both methods described in the report were able to detect most if not all emergencies in a study that evaluated several hundreds of recorded normal flight situations and several emergency situations. The fuzzy method exhibited a superior performance as, in contrast to the binary method, it did not cause any false alarms.

The fuzzy method mentioned above processes parameter value constellations using fuzzy mathematics and generates a statement "accident is occurring" with an associated truth value from 0 to 1 where 0 means "not true" and 1 means "true". A threshold upon this truth value then defuzzifies the statement. That is, if the truth value exceeds the threshold the trigger becomes positive. The threshold has been chosen conservatively so that no false alarms are generated. That is, the fuzzy method will trigger rather late, when there is no doubt any more that an accident will happen. Thus, the advantage of avoiding false alarms is achieved at the disadvantage that late triggers leave little time, e.g. for transmitting sufficient amounts of flight data prior to the aircraft impact.

Hence, there still appears to be a need to develop and improve methods used to trigger at least a first emergency measure, i.e. to determine accurately if an aircraft is in a normal flight situation or in an emergency situation. In particular, further improvements are needed that allow a sufficiently early detection of an aircraft emergency but also prevent unintended activation of emergency measures where activation by acceleration or crash or impact sensors is additionally required.

In a first aspect the present disclosure solves this problem by providing a method for triggering a plurality of emergency measures, wherein first a risk-level is determined that indicates the likelihood of an emergency and second for each emergency measure of the plurality of emergency measures a threshold is defined and each emergency measure of the plurality of emergency measures is only triggered if the determined risk level exceeds the threshold defined for the respective emergency measure.

The present disclosure relates to a triggering of a plurality of emergency measures. An emergency measure can be any kind of measure or action that is taken in response to an emergency of aircraft. Emergency measures include, for example, the notification of rescue personal about an accident and its location by activation of an Emergency Locator Transmitter. Another emergency measure may be a transmission of flight data that is recorded in a flight recorder via a satellite data transmission system to enable post-accident analysis of the causes of the emergency. Also a Deployable Flight Recorder can be armed as an emergency measure or even be deployed or ejected from an aircraft.

A plurality of emergency measures is associated with an aircraft emergency. An aircraft emergency can be any situation of an aircraft in which the aircraft may require outside assistance. Examples of aircraft emergencies are controlled and uncontrolled flights into terrain and mid-air collisions of two aircraft. The term aircraft emergency preferably refers to any kind of emergency that requires emergency measures to be undertaken. It is also possible to limit the term aircraft emergency to which the plurality of emergency measures is associated to one specific kind of emergency situation such as an uncontrolled flight into terrain. In other exemplary embodiments it is even possible to restrict the term aircraft emergency to one kind of aircraft emergency including the cause of this aircraft emergency, e.g. an uncontrolled flight into terrain caused by an engine failure.

According to the present disclosure a risk level for an aircraft emergency is determined by evaluating a plurality of flight parameters and/or aircraft parameters using a predefined logic. A logic can be any set of functions or rules that allows to determine a risk or risk level for an aircraft emergency from a plurality of flight and/or aircraft parameters. The logic itself is predetermined, i.e. the rules that determine if an aircraft is in an emergency situation are fixed. Consequently the flight parameters and aircraft parameters evaluated to determine the risk level are also predetermined or fixed. The logic may be any kind of logic, however, in a preferred embodiment the logic is a fuzzy logic using fuzzy or soft states to determine the risk level of an aircraft emergency. In other words, the state of a flight parameter evaluated to determine the risk level may take fuzzy values such as "normal", "marginal" or "excessive". The translation of a flight or aircraft parameter into a fuzzy value is performed using so-called fuzzy functions, wherein the parameter is translated for each fuzzy value into a real number between 0.0 and 1.0 indicating the degree to which the state of the parameter is e.g. "normal", "marginal" or "excessive". It is, however, also possible to incorporate parameters into the rules that take sharp values in the form of a Boolean parameter or value, e.g. a stall warning is either "true" or "false".

Flight parameters included into the determination of the risk level are, for example, a roll angle and a roll rate of the aircraft, a pitch angle and a pitch rate, a vertical speed, i.e. a climb rate or rate of descent of the aircraft, a calibrated airspeed (CAS), an indicated airspeed (IAS), an acceleration of the aircraft along the yaw or normal axis or the pitch or lateral axis, a radio altitude (i.e. an altitude above ground), roll and rudder commands and engine parameters. Further, parameters indicating a flight situation such as a stall warning, an overspeed warning, a terrain awareness and warning system (TAWS) warning, a traffic alert and collision avoidance system (TCAS) warning, a bad take-off warning and a cabin altitude warning may also be evaluated. However, the present disclosure is neither restricted to the evaluation of exactly these parameters nor do all of these parameters necessarily have to be evaluated.

In the exemplary embodiment in which a fuzzy logic is used, every evaluated parameter is translated into one or more fuzzy values using fuzzy functions known to the person skilled in the art. The fuzzy values are then evaluated using the predetermined logic or rules and the result is defuzzificated to determine a risk level. The risk level may take up any value between 0.0 and 1.0, wherein 0.0 indicates that there is no risk of an aircraft emergency whereas 1.0 indicates that an aircraft emergency is certain.

Once a risk level has been determined using a fuzzy logic or any other kind of logic it has to be determined if any emergency measure of the plurality of emergency measures has to be triggered. According to the present disclosure to this end a threshold is defined for each of the emergency measures and if the risk level exceeds a threshold defined for a specific emergency measure, the emergency measure is triggered. In other words, the risk level determined from the flight and/or aircraft parameters is compared to each of the defined thresholds. If the risk level is greater than or, in an exemplary embodiment, also equal to a threshold, the emergency measure for which the respective threshold has been defined is activated or triggered. Each threshold may be fixed permanently to the same value or be adjusted according to different aspects.

Thus, the present disclosure advantageously allows defining different thresholds for different emergency measures. For example, an emergency measure that does not automatically trigger an expensive rescue operation such as the transmission of flight data may be triggered at a lower risk level than the activation of an Emergency Locator Transmitter. Thus, a threshold associated with a transmission of flight data could be set to a lower risk level than a threshold associated with the activation of an Emergency Locator Transmitter. Other emergency measures such as the ejection of a Deployable Flight Recorder could cause severe damage if triggered too early or unintendedly. Thus, a threshold for ejecting the flight recorder could advantageously be set at an even higher risk level.

In a preferred embodiment for at least one emergency measure of the plurality of emergency measures a different threshold is defined than for at least one other emergency measure of the plurality of emergency measures.

According to another preferred embodiment a time-until-impact is calculated. The at least one emergency measure of the plurality of emergency measures is only triggered if the risk level exceeds the threshold defined for the at least one emergency measure and the calculated time-until-impact is less than a predetermined time-until-impact.

In the preferred embodiment a time-until-impact, e.g. a time until an aircraft flies—controlled or uncontrolled—into terrain or collides with another aircraft is calculated. The time-until-impact may either be calculated if the risk level exceeds for at least one emergency measure the threshold defined for the emergency measure or be calculated continuously. The method may use flight and/or aircraft parameters and calculate a trajectory of the aircraft itself and determine a potential time-until-impact or use data provided by a TAWS or TCAS. Regardless how the time-until-impact is determined, the triggering of at least one emergency measure does not only depend on the risk level but also on the time-until-impact.

The emergency measure is only triggered if the threshold associated with the emergency measure has been exceeded and the time-until-impact is less than a predetermined timeuntil-impact. For example, a Deployable Flight Recorder should be armed and ejected as close to the actual side of the flight into terrain as possible. Thus, the predetermined time-until-impact is set to a very short time such that the Deployable Flight Recorder is advantageously only armed and ejected at the very last moment before the impact.

Another preferred embodiment of the method according to the present disclosure comprises adjusting the threshold defined for at least one emergency measure of the plurality of emergency measures according to a position of the aircraft over ground, wherein the threshold for the at least one emergency measure is preferably adjusted to a different value if the aircraft is flying over land than if the aircraft is flying over sea and/or to a different value if the aircraft is within a predefined region around an airport than if the aircraft is not within a predefined region around an airport.

In the preferred embodiment a threshold defined for at least one emergency measure of the plurality of emergency measures is adjusted according to a position or location of the aircraft over ground. The position may be determined using a satellite positioning system such as GPS, Glonass or Galileo. However, the position could as well be determined using terrestrial radio navigation in particular in the vicinity of airports. A threshold for at least one emergency measure is adjusted according to a position of aircraft. For example, a threshold for initiating a transmission of flight data via a satellite data transmission system may be set to a lower value if the aircraft is flying in regions with low data transmission bandwidth. Thereby, a data transmission is advantageously initiated at a lower risk level in these regions. In other regions where a high bandwidth is available, the threshold is adjusted such that the data transmission is only triggered at a higher risk level. Thereby, unnecessary expensive data transmission is avoided at lower risk levels.

A threshold may in one exemplary embodiment be adjusted according to a land/sea distinction. The position of the aircraft is classified as being either a sea position or a land position. Depending on the outcome of the classification the threshold is adjusted. For example, a threshold assigned to an activation of an Emergency Locator Transmitter can advantageously be adjusted or set such that the Emergency Locator Transmitter is activated at a lower risk level if the aircraft is flying over sea than if the aircraft is flying over land. A successful activation over sea is more important than an activation over land, as it is usually more difficult to locate the side of a flight into terrain over sea than over land.

In another exemplary embodiment a threshold is adjusted to a different value depending on the vicinity of the aircraft to an airport. The vicinity of an airport or predefined region around an airport can be defined, for example, as the area defined by a 25 nautical mile radius around an airport. In another exemplary embodiment the region around an airport may be defined as the approach or landing corridors of the airport. If it has been determined, that the aircraft is within such a region around an airport, the threshold is preferably adjusted to a different value than if the position of the aircraft is not within the vicinity of an airport. Thus, the exemplary embodiment advantageously allows adjusting the thresholds to avoid unnecessary activation of the emergency measures that are caused, for example, by higher risk levels due to more distinct flight maneuvers at low altitudes while approaching or departing from an airport.

According to another preferred embodiment of the present disclosure for at least one phase of flight at least one flight parameter and/or aircraft parameter of the flight and/or aircraft parameters evaluated for determining the risk level is classified irrelevant. If the risk level exceeds the threshold defined for the at least one emergency measure, the predefined logic provides the specific flight parameters and/or aircraft parameters that have caused the risk level to exceed the respective threshold. If further a present phase of flight is the at least one phase of flight for which at least one flight and/or aircraft parameter has been classified as irrelevant and if the flight and/or aircraft parameters having caused the risk level to exceed the respective threshold are among the at least one flight and/or aircraft parameter that is irrelevant in the present phase of flight, the emergency measure is not triggered.

The preferred embodiment advantageously provides an optional cross-check for verifying that an emergency measure is caused by an actual incident and not by a false or erroneous flight parameter and/or aircraft parameter. To this end for at least one phase of flight at least one parameter can be defined, that cannot cause a triggering of an aircraft emergency, i.e. a flight and/or aircraft parameter of the parameters evaluated for determining the risk level is classified irrelevant for a specific phase of flight. Phases of flight are, for example, park, taxi, take-off, approach and cruise. For example, it can be defined that if the phase of flight is taxi, a stall warning may not cause a triggering of an emergency measure as a stall warning can only be a false parameter or a malfunction if the aircraft is taxiing.

Thus, the method according to the present disclosure is adapted in the preferred embodiment to provide the flight and/or aircraft parameter that has caused the risk level to exceed the threshold. Hence, in the above example the method would return that a stall warning has caused the risk level to exceed the threshold. In a further step the present phase of flight is evaluated and essentially a cross-check is performed if the returned parameter is allowed to trigger an emergency measure in the present phase of flight. In other words, parameters that haven taken impossible values in a present phase of flight and are, therefore, clearly a result of a malfunction of an aircraft control system or an implementation of the method are advantageously prevented from triggering an emergency measure. To return to the above example, if the present phase of flight is take-off and a stall warning has caused the exceeding of a threshold, the emergency measure is triggered. However, if the present phase of flight is taxi, the stall warning that has caused the risk level to exceed the threshold cannot trigger any emergency measures as it is among the forbidden or impossible parameters or parameter values.

In an exemplary preferred embodiment if the risk level exceeds the threshold defined for an emergency measure in form of a data transmission, the predefined logic provides the specific flight parameters and/or aircraft parameters that have caused the risk level to exceed the respective threshold and the specific flight parameters and/or aircraft parameters that have caused the risk level to exceed the respective threshold are transmitted using the data transmission. Thereby, an investigation establishing a cause of an aircraft emergency is made easier as a potential reason for an emergency in form of the respective flight or aircraft parameter is already available for investigation before a flight recorder has been retrieved.

Different preferred embodiments of the present disclosure can be combined to achieve advantageous methods for triggering a plurality of emergency methods. Particular embodiments may only be implemented for some of the emergency measures whereas other embodiments may be implemented for other emergency measures only. Thus, the method allows for a flexible approach in which embodiments of the present disclosure are only implemented as far as necessary.

In a second aspect the problem is solved by a system for use onboard an aircraft for triggering a plurality of emergency measures associated with an aircraft emergency, wherein the system comprises a control unit. The control unit is adapted to receive a plurality of flight parameters and/or aircraft parameters from a control system of the aircraft and to determine a risk level for an aircraft emergency by evaluating the plurality of flight parameters and/or aircraft parameters received from the control system using a predefined logic. The control unit is adapted to define for each emergency measure of the plurality of emergency measures a threshold and to trigger each emergency measure of the plurality of emergency measures only if the determined risk level exceeds the threshold defined for the emergency measure.

The system according to the present disclosure is essentially a system for carrying out or performing at least one of the preceding embodiments of the method according to the present disclosure. To this end, the system comprises a control unit in form of a computer or a microcontroller that has been adapted to carry out the method according to the present disclosure. The control unit can be adapted, for example, by installing or providing software on the control unit or by providing the respective features in the form of hardware e.g. by means of hard-wired logic, connectors or busses.

The control unit is in functional connection with a control system of an aircraft and coupled to the aircraft to receive the flight and/or aircraft parameters required to evaluate the predetermined logic and determine a risk level. The connection with the control system is extended in further embodiments such that all necessary parameters can be received from the control system. Further, the control unit is in functional connection with a plurality of emergency measure. The functional connection can be provided, for example, also through the aircraft control system, however, other connections are also possible. The control unit can, for example, be directly connected to an emergency measure such as an Emergency Locator Transmitter such that the control system of the aircraft does not need to be functional to trigger an emergency measure.

With regard to the further adaptations of the control unit that represent the adaptation of the control unit such that it can perform specific embodiments of the method according to the present disclosure, reference is made to the preceding paragraphs. Hence, the embodiments of the system according to the present disclosure share the advantages of those embodiments of the method according to the present disclosure that comprise method features that correspond to the system features of the embodiments of a system according to the present disclosure.

In a preferred embodiment the control unit is adapted to define for at least one emergency measure of the plurality of emergency measures a different threshold than for at least one other emergency measure of the plurality of emergency measures.

It is further preferred that the control unit is adapted to calculate a time-until-impact, wherein the control unit is further adapted to trigger at least one emergency measure of the plurality of emergency measures only if the risk level exceeds the threshold defined for the at least one emergency measure and the calculated time-until-impact is less than a predetermined time-until-impact.

According to a further preferred embodiment of the system according to the present disclosure the control unit is adapted to adjust the threshold defined for at least one emergency measure of the plurality of emergency measures according to a position of the aircraft over ground received from the control system, wherein the control unit is preferably adapted to adjust the threshold for the at least one emergency measure to a different value if the aircraft is flying over land than if the aircraft is flying over sea and/or to a different value if the aircraft is within a predefined region around an airport than if the aircraft is not within a predefined region around an airport.

In another preferred embodiment the control unit is adapted to receive a phase of flight from the control system and to classify for at least one phase of flight at least one flight parameter and/or aircraft parameter as irrelevant. The control unit is further adapted such that if a risk level for at least one emergency measure exceeds the threshold defined for the at least one emergency measure, the predefined logic provides the specific flight parameters and/or aircraft parameters that have caused the risk level to exceed the respective threshold. Furthermore, the control unit is adapted to determine if a present phase of flight received from the control system is the at least one phase of flight for which the control unit is adapted to classify at least one flight and/or aircraft parameter as irrelevant and if the flight parameters and/or aircraft parameters having caused the risk level to exceed the respective threshold are among the at least one flight parameter and/or aircraft parameter that have been classified irrelevant, the emergency measure is not triggered.

In an exemplary preferred embodiment the control unit is adapted such that the predefined logic provides the specific flight parameters and/or aircraft parameters that have caused the risk level to exceed the respective threshold and these specific flight parameters and/or aircraft parameters that have caused the risk level to exceed the respective threshold are transmitted using the data transmission, if the risk level exceeds the threshold defined for an emergency measure in form of a data transmission.

At least one of the emergency measures of the system according to the present disclosure is preferably one of an activation of an Emergency Locator Transmitter, a data transmission, an arming of a Deployable Flight Recorder and a deployment of a Deployable Flight Recorder.

The control unit is preferably adapted to determine the risk level by evaluating a plurality of flight parameters and/or aircraft parameters received from the control system using a predefined fuzzy logic.

In a third aspect the present disclosure relates to an aircraft comprising a system according to any of the preceding preferred embodiments. The aircraft according to the present disclosure shares all advantages of the respective embodiments of the system comprised by the aircraft.

BRIEF DESCRIPTION OF THE DRAWINGS

In the following an exemplary embodiment of the method and an exemplary device of the system according to the present disclosure will be explained in more detail with reference to the drawings, wherein.

DETAILED DESCRIPTION

Figure 1:
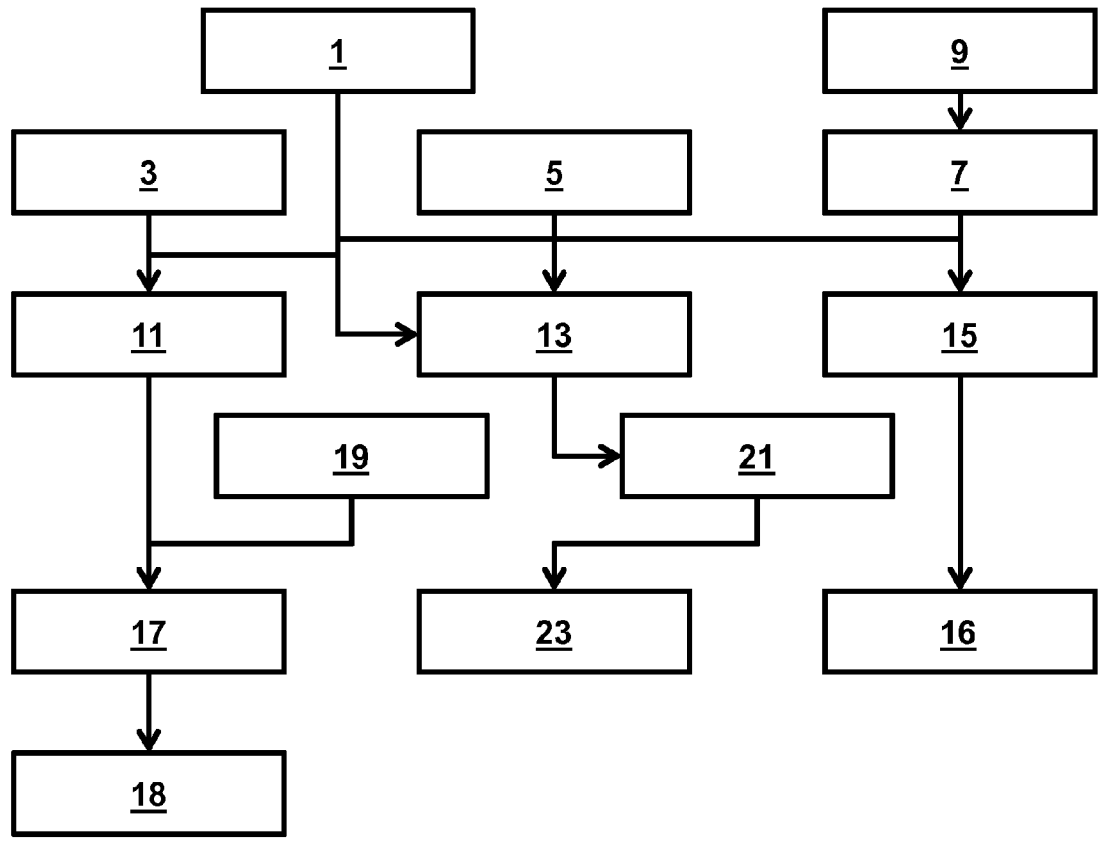
FIG. 1 shows a flow chart of an exemplary embodiment of a method according to the present disclosure.

In FIG. 1 a flow chart of an exemplary embodiment of a method for triggering a plurality of emergency measures according to the present disclosure is shown. In the exemplary embodiment three different emergency measures are triggered if a risk level exceeds predetermined thresholds. For two of the three emergency measures further criteria have to be met if the emergency measure is to be triggered.

At first a risk level or risk has to be determined in a risk level determination step 1 by evaluating a plurality of flight and/or aircraft parameters using a predetermined logic. In the exemplary embodiment of a method according to the present disclosure shown in FIG. 1 the evaluated parameters include a roll angle of the aircraft, a pitch angle and a pitch rate, an acceleration of the aircraft along the pitch or lateral axis and roll commands. Further, parameters indicating a flight situation such as a stall warning, a terrain awareness and warning system (TAWS) warning, a traffic alert and collision avoidance system (TCAS) warning, a bad take-off warning and a cabin altitude warning are also evaluated.

The rules for determining the outcome of the fuzzy logic are:

IF
    {pitch angle AND roll angle AND pitch rate AND captain roll command AND acceleration along the pitch axis} ARE {normal}
    AND                                                         (1)
    {TAWS warning AND stall warning AND cabin altitude warning
    AND TCAS warning AND bad take-off warning} ARE {false}
THEN
    {no accident is occurring}
IF
    {pitch angle OR roll angle OR pitch rate OR roll command OR acceleration along the pitch axis} ARE {excessive}
    OR                                                           (2)
    {TAWS warning OR stall warning OR cabin altitude warning OR TCAS warning OR bad take-off warning} ARE {true}
THEN
    {accident is occurring}
IF
    {pitch angle AND roll angle AND pitch rate} ARE {marginal}
    OR                                                           (3)
    {acceleration along the pitch axis} IS {marginal}
THEN
    {accident is occurring}

In the rules "IF", "AND", "OR", "IS/ARE" and "THEN" are operators of the fuzzy logic. The state of the parameters is described using standard fuzzy functions that are known to the person skilled in the art. Likewise, several different defuzzyfication methods can be used to determine the outcome of the rules. The result of the rules is a risk level that can be somewhere between 0.0 and 1.0, wherein 0.0 indicates that the risk of an aircraft emergency occurring is zero, whereas 1.0 indicates that it is certain that an aircraft emergency will occur.

For each of the three emergency measures a threshold has to be determined in a respective threshold determination step 3, 5, 7. Thus, in an advantageous manner for each of the emergency measures a threshold is determined taking into consideration the specific requirements of the respective emergency measure.

In threshold determination step 3 a threshold for triggering a deployment or ejection of a Deployable Flight Recorder is determined. Here, a fixed threshold is set or determined that is independent of further parameters. For ejecting a Deployable Flight Recorder advantageously a threshold is chosen such that the data recorder is only ejected if the aircraft emergency is certain or nearly certain. In another threshold determination step 5 a threshold for triggering a data transmission is set. This threshold is also kept constant and advantageously chosen such that the data transmission is already triggered at a lower risk value as a data transmission requires sufficient time and is not necessarily combined with sending an alarm signal.

In a further threshold determination step 7 the threshold for an activation of an Emergency Locator Transmitter is determined. The threshold is not constant but depends on a current location or position of the aircraft over ground determined in a positioning step 9. The current position is determined using GPS or, in the vicinity of an airport, using a terrestrial radio navigation system. In the threshold determination step 7 the position determined by the positioning system is classified by a sea/land distinction process. To this end a map or database or function is available that provides a grid of positions and for each position an indication whether it is considered to be sea or land. If a position is classified or determined as being sea or over sea, the threshold is set to a different value than if the position is classified as being land or over land by the threshold determination step 7. In the particular embodiment shown in FIG. 1 the threshold is set such that the Emergency Locator Transmitter is activated at a lower risk level if the current position is classified as sea and at a higher risk level if the current position is classified as land. Thus, in an advantageous manner the method incorporates the higher importance of activating an Emergency Locator Transmitter in time if an aircraft is flying over sea as the search for an aircraft that has flown into terrain or collided in mid-air is more complicated over sea than over land.

Additionally, the threshold determination step 7 also uses the position provided by the positioning step 9 to determine if the aircraft is within a region around an airport or not within a region around an airport. For example, if the aircraft is within a 25 nm radius around an airport, it is classified as being within a region around an airport. Alternatively, an aircraft may also be classified as being within a region around an airport if it is within an approach corridor of an airport. If it has been determined that the aircraft is within a region around an airport, the threshold is set such that the emergency measure is only triggered at a higher risk level then if it has been determined that the aircraft is not within a region around an airport. Thereby, advantageously the emergency measure is only triggered at higher risk levels in the vicinity of airports where more pronounced flight maneuvers are common without necessarily being an indication of an aircraft emergency. Hence, false alarms in the vicinity of airports are advantageously prevented.

Having determined all thresholds in the respective threshold determination steps 3, 5, 7 the risk level determined in the risk level determination step 1 is then compared to each of the thresholds in respective comparison steps 11, 13, 15. In the comparison steps 11, 13, 15 it is determined if the risk level exceeds the respective threshold. For example, in comparison step 15 the risk level is compared to the threshold for activation of the Emergency Locator Transmitter. If the risk level exceeds the threshold or is greater than the threshold, the Emergency Locator Transmitter is activated or triggered in a triggering step 16.

If it is determined in the comparison step 11, that the risk level exceeds the threshold set for the deployment of a Deployable Flight Recorder the emergency measure is not triggered immediately. Further requirements have to be met before the respective emergency measure is triggered.

In case of the deployment of a Deployable Flight Recorder, in a further step 17 a current time-until-impact is compared to a predetermined time-until-impact and the Deployable Flight Recorder is only triggered in a triggering step 18 if the current time-until-impact is less than the predetermined time-until-impact. A current time-until-impact is determined in a trajectory step 19 in which the trajectory of the aircraft is calculated from flight and aircraft parameters. Alternatively, in the trajectory step 19 a time-until-impact may be provided by a TAWS or TCAS. By triggering the deployment of a Deployable Flight Recorder in the triggering step 18 only if in addition to the exceeding of a risk level a time-until-impact is less than a predetermined time-until-impact, it is advantageously ensured that even in the malfunction of a crash or impact detection sensor connected to the Deployable Flight or Data Recorder, the Deployable Flight Recorder is only ejected close to the side of the flight into terrain or the collision and additional damage by a Deployable Flight Recorder ejected, for example, over densely populated areas is avoided.

Similarly, the data transmission is not triggered immediately if in a risk level comparison step 13 it has been determined that the risk level determined in the risk level determination step 1 exceeds the threshold determined in the threshold determination step 5. For this part of the method shown in FIG. 1, the risk level determination step 1 has been amended to provide that parameter or those parameters of the evaluated flight and aircraft parameters that have caused the risk level to exceed the threshold. For example, the risk level has exceeded the threshold as the stall warning was true (see equation (2)). Before the emergency measure, and to be more precise the data transmission, is triggered in a cross-check step 21 it is checked if a stall warning is allowed to trigger an emergency measure in the present phase of flight.

Thus, first a present phase of flight has to be obtained from a control system of an aircraft. A phase of flight may be, for example, park, taxi, take-off, approach or cruise. For at least one phase of flight one or more flight and/or aircraft parameters of those parameters evaluated to determine the risk level are classified as irrelevant, i.e. these parameters cannot trigger an emergency measure. In the present example a stall warning is classified irrelevant if the flight phase or phase of flight is taxi. In the following cross-check step 21 the current phase of flight is established and it is determined if for this current phase of flight at least one parameter as been classified as irrelevant. If for the present phase of flight any restrictions have been put on parameters that cannot trigger an emergency measure, the parameter or parameters that have caused the risk level to exceed the threshold are compared. If a match is found, no emergency measure is triggered in a triggering step 23 though the risk level exceeds the threshold. On the other hand if no match is found or no parameters are defined for the present phase of flight, the emergency measure is triggered in the triggering step 23. To return to the previous example, if the present phase of flight is taxi and the parameter that has caused the risk level to exceed the threshold is a stall warning, no emergency measure, i.e. no data transmission, is triggered in the triggering step 23. If, however, the present phase of flight is another phase or another parameter has caused the risk level to exceed the threshold, a data transmission is triggered in the triggering step 23 after the cross-check step 21.

Hence, the cross-check step 21 allows in an advantageous manner to prevent accidental emergency measures that were caused by malfunctions of an implementation of a method according to the present disclosure or false or erroneous flight and aircraft parameters. In the exemplary embodiment shown in FIG. 1, the cross-check step 21 is only applied to one of three emergency measures to keep the drawing less complex. In an actual implementation of the method the cross-check step 21 would most likely be applied to most if not all of the emergency measures. The exemplary embodiment shown in FIG. 1 shows only one possible way of carrying out the method and splitting it in steps. Other steps and other sequences of steps are equally well possible. For example, a cross-check step 21 may be performed directly after a risk level has been determined in the risk level determination step 1, such that only risk levels are accepted that have been caused by flight parameters that may cause an emergency measure to be triggered.

The data transmission triggered in the triggering step 23 advantageously transmits among the other data that is transmitted also the specific flight and/or aircraft parameters that have caused the risk level to exceed the threshold. Such data transmission can also be implemented without using a cross-check step 21 as long as the predefined logic is adapted to provide those parameters that have caused the risk level to exceed the predefined threshold. By transmitting those parameters that have caused the risk level to exceed the threshold, e.g., to a ground control, investigation of a cause of the aircraft emergency is facilitated as the investigation has knowledge of the critical parameters before a flight recorder has been found and evaluated.

Figure 2:
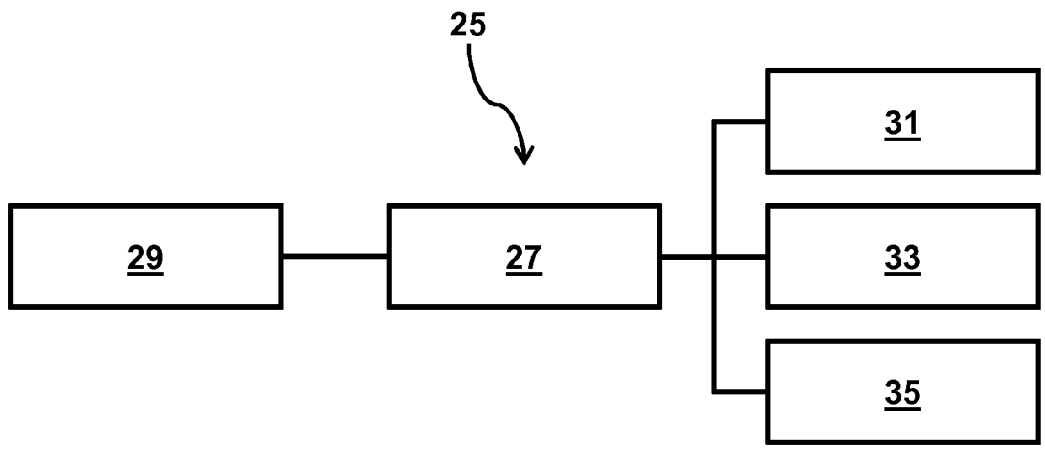
FIG. 2 shows a schematic drawing of an exemplary embodiment of a system according to the present disclosure.

Finally, FIG. 2 shows an exemplary embodiment of system 25 according to the present disclosure. The system 25 comprises a control unit 27 onboard an aircraft (not shown) that is functionally connected to an aircraft control system or simply control system 29 and three emergency measures 31, 33, 35. The emergency measures 31, 33, 35 comprise an activation of an Emergency Locator Transmitter 31, an ejection of a Deployable Flight Recorder 33 and a data transmission 35. The control unit 27 is a data processing unit, e.g. in form a conventional computer or a microcontroller, that is connected to the control system 29 of the aircraft such that it can receive all flight and aircraft parameters required to determine a risk level for an aircraft emergency and to adjust thresholds for triggering emergency measures 31, 33, 35.

On the control unit 27 an exemplary embodiment of a method according to the present disclosure as shown in FIG. 1 is implemented in software. By means of the software the control unit 27 is adapted to evaluate the flight and aircraft parameters received from the control system 29 to determine a risk level and three thresholds as described with respect to FIG. 1. Furthermore, the control unit 27 is also adapted by means of software installed or provided on the control unit 27 to compare the determined thresholds and the determined risk level. If the risk level exceeds a threshold, the control unit 27 is adapted to trigger the respective emergency measure associated with that threshold if all further requirements are met.

The exemplary embodiment of a system 25 according to the present disclosure shown in FIG. 2 shares the advantages of the exemplary embodiment of a method according to the present disclosure shown in FIG. 1.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for triggering a plurality of emergency measures associated with an aircraft emergency, the method comprising determining a risk level for an aircraft emergency by evaluating a plurality of flight parameters or aircraft parameters using a predefined logic,
   wherein for each emergency measure of the plurality of emergency measures a threshold is defined and each emergency measure of the plurality of emergency measures is only triggered if the determined risk level exceeds the threshold defined for the emergency measure,
   wherein at least one emergency measure of the plurality of emergency measures is only triggered if the risk level exceeds a threshold defined for the at least one emergency measure and a calculated time-until-impact is less than a predetermined time-until-impact, or
   wherein at least one emergency measure is not triggered though the risk level exceeds the threshold defined for the at least one emergency measure if the calculated time-until-impact is less than a predetermined time-until-impact.

2. The method according to claim 1, wherein for at least one emergency measure of the plurality of emergency measures a different threshold is defined than for at least one other emergency measure of the plurality of emergency measures.

3. The method according to claim 1, wherein the method comprises adjusting the threshold defined for at least one emergency measure of the plurality of emergency measures according to a position of the aircraft over ground.

4. The method according to claim 3, wherein the threshold for the at least one emergency measure is adjusted to a different value if the aircraft is flying over land than if the aircraft is flying over sea or to a different value if the aircraft is within a predefined region around an airport than if the aircraft is not within a predefined region around an airport.

5. The method according to claim 1, wherein for at least one phase of flight at least one flight parameter or aircraft parameter of the flight or aircraft parameters evaluated for determining the risk level is classified as irrelevant,
   if the risk level exceeds the threshold defined for at least one emergency measure, the predefined logic provides the specific flight parameters or aircraft parameters that have caused the risk level to exceed the respective threshold, and
   if a present phase of flight is the at least one phase of flight for which at least one flight or aircraft parameter has been classified as irrelevant and if the flight parameters or aircraft parameters having caused the risk level to exceed the respective threshold are among the at least one flight or aircraft parameter that have been classified as irrelevant, the emergency measure is not triggered.

6. The method according to claim 1, wherein at least one of the emergency measures is one of an activation of an Emergency Locator Transmitter, a data transmission, an arming of a Deployable Flight Recorder and a deployment of a Deployable Flight Recorder.

7. The method according to claim 1, wherein the risk level is determined by evaluating a plurality of flight parameters or aircraft parameters using a predefined fuzzy logic.

8. A system for use onboard an aircraft for triggering a plurality of emergency measures associated with an aircraft emergency, wherein the system comprises a control unit,
   wherein the control unit is adapted to receive a plurality of flight parameters or aircraft parameters from a control system of the aircraft and to determine a risk level for an aircraft emergency by evaluating the plurality of flight parameters or aircraft parameters received from the control system using a predefined logic,
   wherein the control unit is adapted to define for each emergency measure of the plurality of emergency measures a threshold and to trigger each emergency measure of the plurality of emergency measures only if the determined risk level exceeds the threshold defined for the emergency measure,
   wherein the control unit is further adapted to trigger at least one emergency measure of the plurality of emergency measures only if the risk level exceeds a threshold defined for the at least one emergency measure and a calculated time-until-impact is less than a predetermined time-until-impact.

9. The system according to claim 8, wherein the control unit is adapted to define for at least one emergency measure of the plurality of emergency measures a different threshold than for at least one other emergency measure of the plurality of emergency measures.

10. The system according to claim 8, wherein the control unit is adapted to adjust the threshold defined for at least one emergency measure of the plurality of emergency measures according to a position of the aircraft over ground received from the control system,
    wherein the control unit is adapted to adjust the threshold for the at least one emergency measure to a different value if the aircraft is flying over land than if the aircraft is flying over sea or to a different value if the aircraft is in within a predefined region around an airport than if the aircraft is not within a predefined region around an airport.

11. The system according to claim 8, wherein the control unit is adapted to receive a phase of flight from the control system and to classify for at least one phase of flight at least one flight parameter or aircraft parameter of the flight or aircraft parameters evaluated for determining the risk level as irrelevant,
    that the control unit is further adapted such that if the risk level exceeds the threshold defined for at least one emergency measure, the predefined logic provides the specific flight parameters or aircraft parameters that have caused the risk level to exceed the respective threshold, and that the control unit is further adapted to determine if a present phase of flight received from the control system is the at least one phase of flight for which the control unit is adapted to classify at least one flight or aircraft parameter as irrelevant and if the flight parameters or aircraft parameters having caused the risk level to exceed the respective threshold are among the at least one flight parameter or aircraft parameter that have been classified as irrelevant, the emergency measure is not triggered.

12. The system according to claim 8, wherein at least one of the emergency measures is one of an activation of an Emergency Locator Transmitter, a data transmission, an arming of a Deployable Flight Recorder and a deployment of a Deployable Flight Recorder.

13. The system according to claim 8, wherein the control unit is adapted to determine the risk level by evaluating a plurality of flight parameters or aircraft parameters received from the control system using a predefined fuzzy logic.

14. An aircraft comprising a system according to claim 8.

15. A method for triggering a plurality of emergency measures associated with an aircraft emergency, wherein the method comprises determining a risk level for an aircraft emergency by evaluating a plurality of flight parameters or aircraft parameters using a predefined logic, wherein for each emergency measure of the plurality of emergency measures a threshold is defined and each emergency measure of the plurality of emergency measures is only triggered if the determined risk level exceeds the threshold defined for the emergency measure, wherein for at least one phase of flight at least one flight parameter or aircraft parameter of the flight or aircraft parameters evaluated for determining the risk level is classified as irrelevant, that if the risk level exceeds the threshold defined for at least one emergency measure, the predefined logic provides the specific flight parameters or aircraft parameters that have caused the risk level to exceed the respective threshold, and that if a present phase of flight is the at least one phase of flight for which at least one flight or aircraft parameter has been classified as irrelevant and if the flight parameters or aircraft parameters having caused the risk level to exceed the respective threshold are among the at least one flight or aircraft parameter that have been classified as irrelevant, the emergency measure is not triggered.

16. A system for use onboard an aircraft for triggering a plurality of emergency measures associated with an aircraft emergency, wherein the system comprises a control unit, wherein the control unit is adapted to receive a plurality of flight parameters or aircraft parameters from a control system of the aircraft and to determine a risk level for an aircraft emergency by evaluating the plurality of flight parameters or aircraft parameters received from the control system using a predefined logic, wherein the control unit is adapted to define for each emergency measure of the plurality of emergency measures a threshold and to trigger each emergency measure of the plurality of emergency measures only if the determined risk level exceeds the threshold defined for the emergency measure, wherein the control unit is adapted to receive a phase of flight from the control system and to classify for at least one phase of flight at least one flight parameter or aircraft parameter of the flight or aircraft parameters evaluated for determining the risk level as irrelevant, that the control unit is further adapted such that if the risk level exceeds the threshold defined for at least one emergency measure, the predefined logic provides the specific flight parameters or aircraft parameters that have caused the risk level to exceed the respective threshold, and that the control unit is further adapted to determine if a present phase of flight received from the control system is the at least one phase of flight for which the control unit is adapted to classify at least one flight or aircraft parameter as irrelevant and if the flight parameters or aircraft parameters having caused the risk level to exceed the respective threshold are among the at least one flight parameter or aircraft parameter that have been classified as irrelevant, the emergency measure is not triggered.

* * * * *